(12) United States Patent
Adams et al.

(10) Patent No.: US 7,163,248 B2
(45) Date of Patent: Jan. 16, 2007

(54) AUTOMOTIVE CONSOLE WITH ADJUSTABLE ARMREST

(75) Inventors: Robert J Adams, Ypsilanti, MI (US);
Michael W Cass, Lenox, MI (US);
Todd L DePue, Brighton, MI (US);
Kenneth William Paul Shaner, Howell, MI (US)

(73) Assignee: Lear Corporation, Southfield, MI (US)

( * ) Notice: Subject to any disclaimer, the term of this patent is extended or adjusted under 35 U.S.C. 154(b) by 16 days.

(21) Appl. No.: 10/904,386

(22) Filed: Nov. 8, 2004

(65) Prior Publication Data

US 2006/0097532 A1 May 11, 2006

(51) Int. Cl.
*B60R 27/00* (2006.01)
(52) U.S. Cl. .................................. 296/24.34
(58) Field of Classification Search ............. 296/24.34, 296/37.1, 37.8, 37.13
See application file for complete search history.

(56) References Cited

U.S. PATENT DOCUMENTS

| 2,667,237 | A | | 1/1954 | Rabinow ..................... 188/88 |
| 5,284,330 | A | * | 2/1994 | Carlson et al. ........ 267/140.14 |
| 5,460,585 | A | | 10/1995 | Gentry et al. ................. 482/1 |
| 6,095,922 | A | * | 8/2000 | Friedrichsen et al. ......... 464/24 |
| 6,189,662 | B1 | * | 2/2001 | Bivens et al. .............. 188/288 |
| 6,213,445 | B1 | | 4/2001 | Sato et al. ..................... 251/48 |
| 6,349,449 | B1 | * | 2/2002 | Kuehl .......................... 16/342 |
| 6,378,671 | B1 | * | 4/2002 | Carlson .................... 188/267.2 |
| 6,440,322 | B1 | | 8/2002 | Kim et al. ................ 252/62.52 |
| 6,471,018 | B1 | * | 10/2002 | Gordaninejad et al. .. 188/267.1 |
| 6,782,242 | B1 | * | 8/2004 | Koleda et al. ............. 455/90.3 |
| 6,857,675 | B1 | * | 2/2005 | Kurachi et al. .......... 296/37.12 |
| 6,883,680 | B1 | * | 4/2005 | Hirose ......................... 220/830 |
| 6,890,012 | B1 | * | 5/2005 | Maierholzner ........... 296/24.34 |
| 6,968,929 | B1 | * | 11/2005 | Doornbos et al. .......... 188/290 |
| 6,968,930 | B1 | * | 11/2005 | Shibao .................. 188/322.17 |
| 7,040,467 | B1 | * | 5/2006 | Carlson ....................... 188/267 |
| 2003/0080131 | A1 | * | 5/2003 | Fukuo ......................... 220/264 |
| 2003/0155823 | A1 | * | 8/2003 | Willner ........................ 310/51 |
| 2003/0226728 | A1 | | 12/2003 | Shimada et al. ............ 188/267 |
| 2005/0230991 | A1 | * | 10/2005 | Ichioka et al. ............. 296/37.1 |

* cited by examiner

*Primary Examiner*—H Gutman
(74) *Attorney, Agent, or Firm*—Wood,Herron & Evans,LLP

(57) ABSTRACT

A center console for an automobile includes an armrest that is selectively adjustable by vehicle occupants to and between a first position wherein the armrest is in a substantially horizontal orientation, and a second position wherein the armrest extends angularly away from the console. The console further includes a controllable damper coupled to the armrest and actuable between high and low damping states. In the low damping state, the armrest may be selectively placed at any position desired by the vehicle occupants. When the damper is actuated to the high damping state, the damper maintains the selected position of the armrest.

9 Claims, 2 Drawing Sheets

AUTOMOTIVE CONSOLE WITH ADJUSTABLE ARMREST

CROSS-REFERENCE

The present invention is related to U.S. patent application Ser. No. 10/904,385 and U.S. patent application Ser. No. 10/904,387, filed on even date herewith.

FIELD OF THE INVENTION

The present invention pertains generally to automotive interiors, and more particularly to an automotive console having a selectively positionable armrest.

BACKGROUND OF THE INVENTION

Automotive interiors include various features and accessories intended to improve the comfort and convenience of vehicle occupants. For example, automobiles are commonly provided with a center console located between the front seats. The center console typically includes an armrest, various storage bays and compartments, cup and coin holders, and other accessories for improving the comfort and convenience of the vehicle. The armrest of the console may be independently mounted to the console, or it may be mounted to a cover or lid of a storage compartment that is located in the top of the console. The console lid and armrest are generally moveable from a first position in which the lid covers the opening to the storage compartment and wherein the armrest is in a substantially horizontal orientation convenient for occupants to rest their arms, and a second position wherein the armrest extends angularly away from the console to permit access to the storage compartment.

Some vehicles have been equipped with an armrest and console lid that are adjustable to fixed positions intermediate the first and second positions so that occupants may position the armrest in an orientation that is to their liking. These prior adjustable armrests generally allow adjustment to only fixed, discrete positions so that precise adjustment to a particularly desired position is not possible. Moreover, operation of these prior adjustable armrests between the available positions is not smooth, but is rather rough and aesthetically unpleasing. A need therefore exists for an adjustable armrest of an automotive console that addresses these and other drawbacks of the prior art.

SUMMARY OF THE INVENTION

The present invention provides an automotive center console with an armrest that is selectively adjustable to permit vehicle occupants to place the armrest at any desired orientation between a first, horizontal position adjacent the console, and a second position wherein the armrest extends away from the console. In one embodiment, the console includes a console housing having an interior storage compartment and an opening that provides access to the storage compartment. A console lid is located proximate the opening and is movable between open and closed positions which correspond to the first and second positions of the armrest. A controllable damper is coupled to the console lid and is selectively actuable to and between high and low damping states to permit the armrest and console lid to be adjusted relative to the console housing, and to maintain the armrest and console lid in the selected position. The controllable damper may be a linear damper or a rotary damper.

In another embodiment, the armrest and console lid are mounted to a rail that is pivotally coupled to the console housing, adjacent the opening. The console lid is slidably coupled to the rail such that the armrest and lid can be moved upwardly and away from the opening to the storage compartment when the lid is in the open position.

In another embodiment, the controllable damper is a magneto-rheological damper. A permanent magnet associated with the magneto-rheological damper maintains the damper in the high damping state without requiring power to be supplied to the damper. The console further includes a wire coil associated with the magneto-rheological damper and configured to negate the magnetic field produced by the permanent magnet when an electric current is supplied to the coil.

In yet another embodiment, a method of positioning an armrest of an automotive console between first and second positions includes switching a controllable damper from a high damping state to a low damping state, selectively adjusting the position of the armrest between the first position, the second position, or any position therebetween, and switching the controllable damper from the low damping state to the high damping state to maintain the selected position of the armrest.

The features and objectives of the present invention will become more readily apparent from the following Detailed Description taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
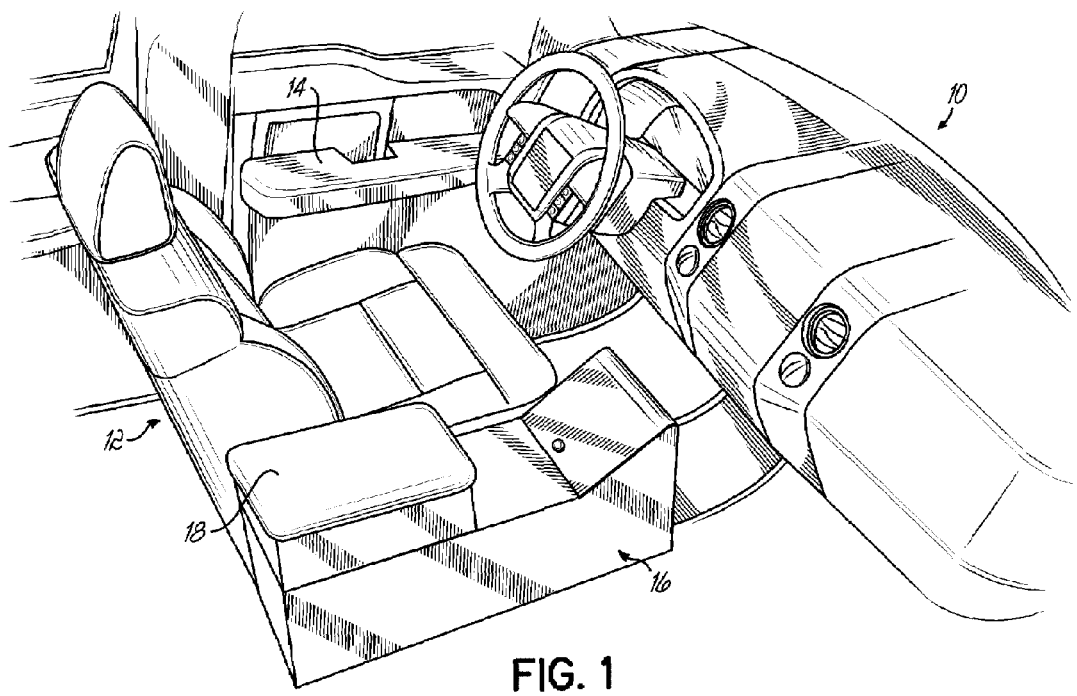
FIG. 1 is a perspective view of an automotive interior including a console according to the present invention.
Figure 2A:
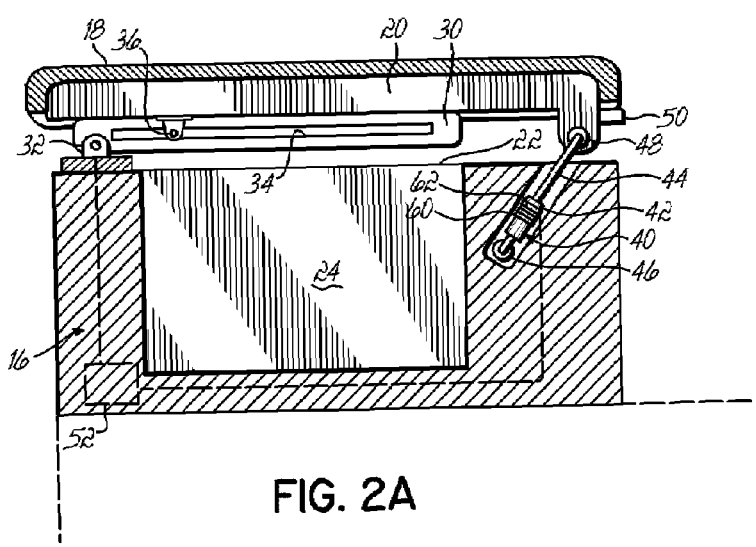
FIGS. 2A–2B are schematic elevation views of the console of FIG. 1.
Figure 2B:
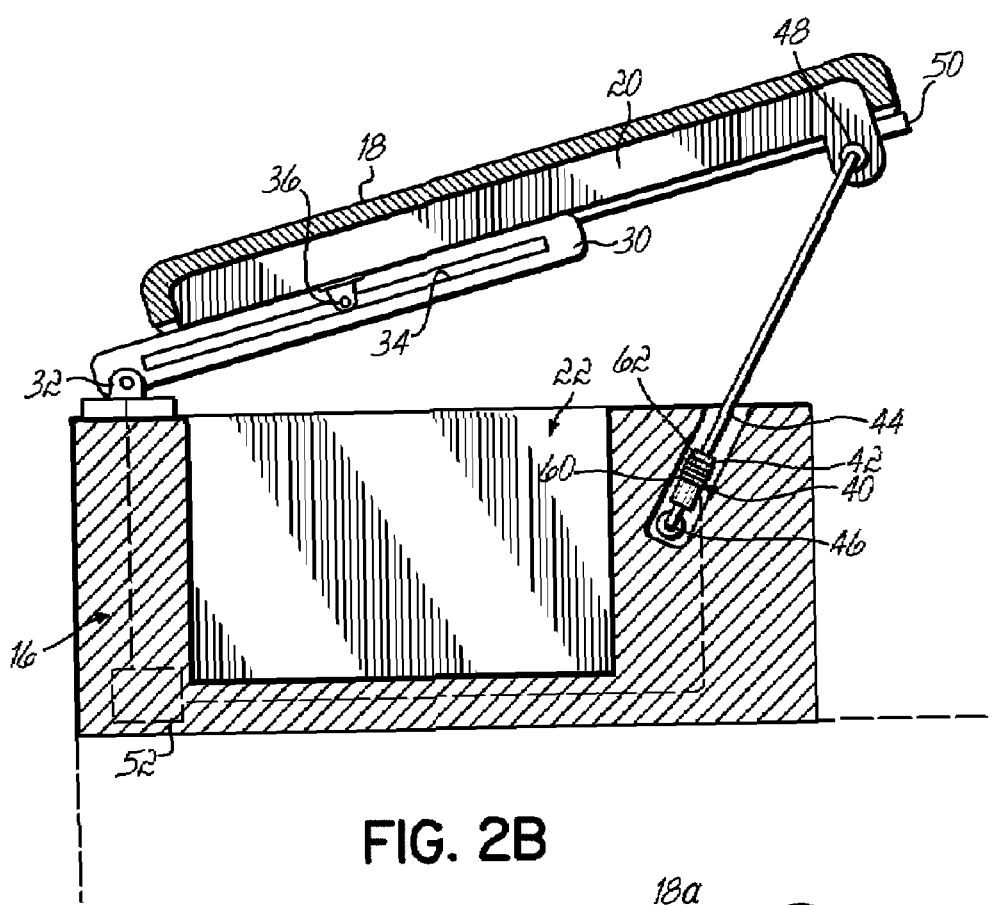

FIG. 1 depicts a typical automotive interior 10, including various components and accessories intended to increase the comfort and convenience of the vehicle, such as articulating seats 12, door mounted armrests 14, and a center console 16. The center console 16 is located generally between the front seats 12 (only one shown) and is provided with an upholstered armrest 18 that provides a convenient place for occupants to rest their arms while seated in the vehicle. Referring now to FIGS. 2A–2B, the armrest 18 is mounted to a console lid 20 that extends across the opening 22 of a storage compartment 24 provided in the top of the console 16. The console lid 20 is moveable from a closed position, depicted in FIG. 2A, wherein the armrest 18 and lid 20 extend across the opening 22 and the armrest 18 is in a generally horizontal orientation, to a fully open position, depicted in FIG. 2B, wherein the armrest 18 and console lid 20 extend away from the opening 22 to permit access to the storage compartment 24.

With continued reference to FIGS. 2A and 2B, the console 16 of the present invention is configured to allow occupants to selectively position the armrest 18 and console lid 20 to the open and closed positions, and any position therebetween, as may be desired, so that the position of the armrest 18 is most convenient for the occupant. In the embodiment shown in FIGS. 2A and 2B, the console 16 includes an elongate rail 30 pivotally coupled to the console 16, such as by a hinge 32, adjacent the opening 22 to the storage compartment 24. A longitudinally extending slot 34 is formed into the rail 30. The console lid 20 is slidably coupled to the rail 30, for example, by a pin 36 extending through the slot 34, so that the armrest 18 and console lid 20 may be slid along the rail 30 from a retracted position, depicted in FIG. 2A, to an extended position, depicted in FIG. 2B.

The console 16 further includes a controllable damper 40 for maintaining the position of the armrest 18 and console lid 20 between the closed position and the open position. In the open position, the armrest 18 and lid 20 extend upwardly and angularly away from the opening 22 to the storage compartment 24. In the embodiment shown, the controllable damper 40 is a linear damper having a housing 42 and a piston rod 44 extensibly slidable from within the housing 42 to adjust the length of the damper 40. The damper 40 is secured at a first end 46 to the console, and a second end 48 is secured to the console lid 20. The controllable damper 40 may be a magneto-rheological damper, an electro-rheological damper, or any other controllable damper that is selectively actuatable to and between high and low damping states.

A switch 50 for actuating the damper 40 is mounted to the console lid 20, generally at a forward position of the lid, so that it can be conveniently accessed by vehicle occupants. It will be recognized, however, that the switch 50 may alternatively be located on other portions of the console 16 or at other locations within the interior 10 of the vehicle. The switch 50 communicates with a controller 52 configured to adjust the damping state of the controllable damper 40 upon receiving a signal from the switch 50. For example, in one embodiment, the controllable damper 40 is a magneto-rheological damper and activation of the switch 50 on the console lid 20 causes the controller 52 to actuate the damper 40 from a high damping state to a low damping state so that the piston rod 44 may be easily extended or retracted from the damper housing 42. In the low damping state, the armrest 18 and console lid 20 may therefore be easily moved to any position between the open and closed positions of the lid 20.

When the desired position of the armrest 18 and lid 20 is reached, further activation of the switch 50, for example, by releasing the switch or by depressing the switch a second time, causes the controller 52 to actuate the damper 40 from the low damping state to the high damping state. In the high damping state, the controllable damper 40 provides sufficient resistance to further movement of the console lid 20 to thereby maintain the armrest 18 and lid 20 in the selected position. When it is desired to reposition the armrest 18 or to move the console lid 20 back to the closed position, the switch 50 may again be activated and the armrest 18 and console lid 20 moved to the desired position, as described above.

In one embodiment, the controllable damper 40 is a magneto-rheological damper that is filled with a fluid that is responsive to an imposed magnetic field to increase the apparent damping of the fluid, as known in the art. The magnetic field is provided by a permanent magnet 60, associated with the controllable damper 40. The permanent magnet 60 provides a magnetic field without requiring power to be supplied to the damper. The magnetic field is sufficient to increase the apparent viscosity of the fluid such that the armrest 18 cannot be moved from the selected position.

The controllable damper 40 further includes a wire coil 62 positioned adjacent the permanent magnet 60. When it is desired to reposition the armrest 18, an electric current from a power source (not shown) is supplied to the wire coil 62 to create an imposed magnetic field that substantially negates the magnetic field provided by the permanent magnet 60. In this manner, the apparent viscosity of the fluid is reduced and the controllable damper 40 is thus actuated to the low damping state. Current to the coil 62 may be controlled, for example, by the switch 50 and controller 52, described above. With the damper 40 in the low damping state, the armrest 18 may be adjusted to a desired position. When the armrest 18 is located in the desired position, the current to the wire coil 62 is stopped whereby the magnetic field produced by the permanent magnet 60 causes the fluid to exhibit an apparent viscosity that corresponds to the high damping state of the controllable damper 40.

In another embodiment, the controllable damper 40 may be actuated to a damping state intermediate the high and low damping states. The intermediate damping state may be useful to control the resistance to movement of the armrest 18 and console lid 20 between selected positions. In this manner, the "feel" of the movement of the armrest 18 and console lid 20 may be tuned to provide aesthetically pleasing performance, as may be desired.

Figure 3:
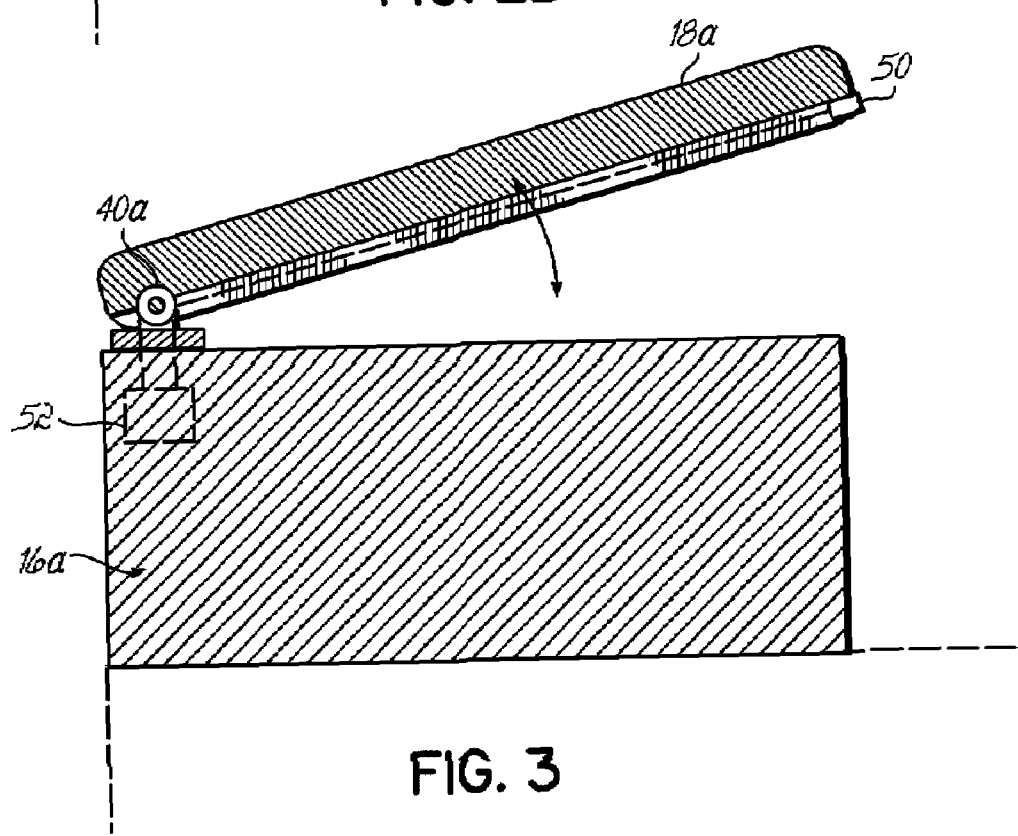
FIG. 3 is a schematic elevational view of another console according to the present invention.

Referring now to FIG. 3, another embodiment of a console 16a according to the present invention utilizes a rotary controllable damper 40a. In this embodiment, the armrest 18a is not mounted to a console lid, but is pivotally coupled to the console 16a by the rotary damper 40a. Other features of the console 16a which are similar to those features described above with respect to FIGS. 2A and 2B are similarly numbered. To move the armrest 18a from the first, horizontal position to the second, extended position, or to any position therebetween, a switch 50 mounted to a forward end of the armrest 18a is activated to cause the controller 52 to send a signal to the controllable damper 40a to actuate the damper from a high damping state to a low damping state. In the low damping state, the armrest 18a may be freely pivoted about the rotational axis of the rotary damper 40a to move the armrest 18a to the desired position. When the armrest 18a is in the desired position, the switch 50 is released or activated a second time to cause the controller 52 to actuate the rotary damper 40a from the low damping state to the high damping state, whereby the armrest 18a is maintained at the selected position.

The controllable damper 40, 40a allows the armrest 18, 18a to be selectively and infinitely positioned in a smooth manner to any desired position between the first and second positions of the armrest 18, 18a. Moreover, the controller 52 may be configured to recall the last position of the armrest 18, 18a so that the armrest can be moved back to a previously selected position after it has been moved, for example, to permit access the storage compartment 24.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described.

Accordingly, departures may be made from such details without departing from the scope or spirit of Applicant's general inventive concept.

What is claimed is:

1. An automotive console assembly, comprising:
   a center console;
   an armrest mounted to said console and movable between a first position wherein said armrest is in a substantially horizontal orientation adjacent said console, and a second position wherein said armrest extends away from said console; and
   a controllable damper coupled to said armrest and selectively actuatable between high and low damping states to facilitate positioning said armrest to and between said first and second positions;
   wherein said controllable damper is a magneto-rheological damper.

2. The console assembly of claim 1, further comprising:
   a console rail pivotally coupled to said console;
   said armrest slidably coupled to said console rail for movement between said first position and said second position, wherein said armrest extends upwardly and angularly away from said console, along said rail, in said second position of said armrest.

3. The console assembly of claim 1, further comprising a switch communicating with said controllable damper and operable to facilitate selective actuation of said controllable damper between said high and low damping states.

4. The console assembly of claim 1, further comprising a permanent magnet associated with said magneto-rheological damper, said permanent magnet adapted to maintain said magneto-rheological damper in said high damping state when no power is supplied to said magneto-rheological damper.

5. The console assembly of claim 4, further comprising:
   a wire coil associated with said permanent magnet and configured to substantially negate a magnetic field produced by said permanent magnet when current is supplied to said wire coil to actuate said magneto-rheological damper from said high damping state to said low damping state.

6. The console assembly of claim 1, wherein said controllable damper is a linear damper.

7. The console assembly of claim 1, wherein said controllable damper is a rotary damper.

8. A method of positioning an armrest of an automotive console between a first, horizontal position adjacent the console, and a second position wherein the armrest extends away from the console, the console including a controllable damper coupled to the armrest, the method comprising:
   switching the controllable damper from a high damping state to a low damping state;
   selectively adjusting the position of the armrest to at least one of the first position, the second position, or a position intermediate the first and second positions; and
   switching the controllable damper from the low damping state to the high damping state such that the armrest is maintained in the adjusted position by the controllable damper;
   wherein the controllable damper is a magneto-rheological damper.

9. The method of claim 8, wherein the console includes a magnet associated with the magneto-rheological damper, and wherein the magnet is configured to maintain the high damping state when no power is supplied to the damper.

* * * * *